United States Patent Office 2,950,165
Patented Aug. 23, 1960

2,950,165

NEW DYEING PROCESS

Harry Rose Hadfield, Brian Batterbee, and Denis Ronald Lemin, Manchester, England, assignors to Imperial Chemical Industries Limited, Millbank, London, England, a corporation of Great Britain No Drawing. Filed Sept. 10, 1957, Ser. No. 683,012

3 Claims. (Cl. 8—54)

This invention relates to a new dyeing process and more particularly it relates to a new process for the dyeing of protein and regenerated protein fibres.

It has previously been proposed to dye protein fibres from aqueous dyebaths with water-soluble azo or anthraquinone dyestuffs containing a s-triazinylamino group substituted in the triazine nucleus by at least on halogen atom. The processes hitherto proposed, however, have described the use of hot dyestuff solutions containing weak acids or acid salts as used for example in the commonly-used methods for dyeing protein fibres with water-soluble dyestuffs.

It has now been found that the said azo or anthraquinone dyestuffs dye protein and regenerated protein fibres in shades of increased levelness when the dyeing operation is carried out at relatively low temperatures in conjunction with a treatment with an acid-binding agent.

According to the invention, therefore, there is provided a process for the dyeing of textile materials comprising protein and regenerated protein fibres with water-soluble azo and anthraquinone dyestuffs containing at least one s-triazinylamino group substituted in the triazine ring by at least one halogen atom, which comprises applying the dyestuff to the textile material from an aqueous solution at a temperature not less than 0° C. and not greater than 55° C., in conjunction with a treatment with a dilute aqueous solution of an acid-binding agent.

The water-soluble azo and anthraquinone dyestuffs containing at least one s-triazinylamino group substituted in the triazine nucleus by at least one halogen atom, may be obtained by interacting a cyanuric halide or a 2:4-dihalogeno-s-triazine with a water-soluble azo, polyazo or anthraquinone dyestuff containing one or more amino and/or mono-substituted amino groups.

As examples of cyanuric halides which may be used, there may be mentioned cyanuric chloride and cyanuric bromide.

As examples of 2:4-dihalogeno-s-triazines which may be used there may be mentioned those 2:4-dihalogeno-s-triazines and especially 2:4-dichloro-s-triazines substituted in the 6 position of the triazine ring by alkyl groups such as methyl, by aryl groups such as phenyl, by alkoxy group such as methoxy, by aryloxy groups such as phenoxy, by amino or substituted amino groups, by alkylmercapto groups such as methylmercapto, by arylmercapto groups such as phenyl mercapto.

The substituted amino groups present in the triazine ring may be mono- or di-substituted and include the groups obtained by removal of a hydrogen atom attached to the nitrogen atom of for example, colourless alkyl- or arylamines such as methylamine, butylamine, diethylamine, beta-hydroxyethylamine, cyclohexylamine, aniline, beta-naphthylamine, metanilic acid, 2:4-diaminobenzenesulphonic acid, 2-naphthylamine-4:8-disulphonic acid, 1-amino-8-naphthol-3:6-disulphonic acid, 2-amino-5-naphthol-7-sulphonic acid, p-toluidine, n-anisidine, 2:4-dichloroaniline and also diamines such as ethylene diamine, p-phenylene diamine and 4:4'-diaminostilbene-disulphonic acid.

The preferred acid-binding agents used are the water-soluble carbonates and bicarbonates, especially sodium carbonate and sodium bicarbonate. The strength of the solution of acid-binding agent used may be from 0.1% to 3.0%. Even lower concentrations, for example, 0.01% alkali may be used in certain cases. When the treatment with the solution of the acid-binding agent is performed in a separate step before or after the treatment with the solution of the dyestuff, the excess of the first solution applied may be removed and the impregnated material may, if desired, be dried at any convenient temperature, for example between 80° C. and 110° C. before the treatment with the second solution. Alternatively the two treatments may be performed successively in a single bath, either first immersing the textile material in the solution of the acid-binding agent and subsequently adding the dyestuff thereto, or preferably first immersing the textile material in the solution of the dyestuff and subsequently adding the acid-binding agent thereto.

When the treatment with the acid-binding agent is performed during the treatment with the dyestuff, a single treatment bath may be used, containing the required amounts of acid-binding agent and of dyestuff. If desired, there may be used a treatment bath containing dyestuff alone and when some exhaustion of the dyebath has occurred, the acid-binding agent may be added thereto, thereby fixing the dyestuff on the textile material and also assisting in the exhaustion of the dyebath. When the treatment with the acid-binding agent is performed during the treatment with the dyestuff, it is preferred to carry out the process at temperatures between 10° C. and 25° C. Subsequently the impregnated material may be dried at any convenient temperature, for example between 80° C. and 130° C.

If desired, neutral salts, for example sodium chloride or sodium sulphate may be added to the dyestuff solution and/or to the solution of the acid-binding agent, and other commonly used non-acidic adjuvants may be used, for example there may also be added a solution of a condensate of ethylene oxide and a fatty alcohol.

The new dyeing process is unexpectedly advantageous over those previously described for dyeing protein and regenerated protein textile materials, for example materials made from casein and the regenerated protein from ground nuts, wool and especially silk, since more level dyeings, and more consistent reproduction of shade are obtained by the new process. Furthermore, when the dyestuff used contains a dihalogenotriazinylamino group, there is frequently obtained a stronger dyeing than if the same amount of dyestuff is used in a hot neutral or acid dyebath.

The invention is illustrated but not limited by the following examples in which parts are by weight:

EXAMPLE 1

2 parts of the dyestuff obtained by interaction of equimolecular proportions of cyanuric chloride and 2-(4'-amino-2'-methylphenylazo-) naphthalene-4:8-disulphonic acid are pasted with a little cold water and then sufficient warm water is added to dissolve the dyestuff. The solution so formed is added to 3,000 parts of water at a temperature of 25° C. 100 parts of pure silk yarn are introduced into this dyebath. 90 parts of common salt are then added portionwise during 30 minutes. After this time 6 parts of soda ash are added portionwise during 30 minutes. Dyeing is continued for a further 15 minutes then the yarn is removed and rinsed in cold water. The dyed yarn is then treated in an aqueous solution containing 0.1–0.2% of a condensate of ethylene oxide with an alkyl phenol and 0.1% of soda ash at 100° C. for 15 minutes.

A bright yellow dyeing of very high fastness to light, to degumming and to other wet treatments is obtained.

Similar results are obtained if in place of the pure silk used in the above example, 100 parts of the regenerated protein fibre manufactured by Imperial Chemical Industries Limited and sold under the name "Ardil" are used or 100 parts of the regenerated protein fibre manufactured by Messrs. Courtaulds Ltd., and sold under the name of "Fibrolane," or 100 parts of chlorinated wool are used.

EXAMPLE 2

Scoured silk fabric is padded through a solution of 5 parts of the dyestuff used in Example 1, 10 parts of sodium bicarbonate and 10 parts of sodium chloride in 1000 parts of water at 25° C. and then evenly squeezed so that it retained approximately 70% of its weight of the solution. The fabric is dried by passing over a heated metal surface at 110° C. and then treated in an aqueous solution containing 0.2% of a condensate of ethylene oxide with an alkyl phenol, and 0.1% of soda ash at 100° C. for 15 minutes, rinsed in water and dried. A fast yellow dyeing is produced.

EXAMPLE 3

A scoured silk fabric is padded through a solution of 5 parts of the dyestuff used in Example 1, 10 parts of sodium bicarbonate and 10 parts of sodium chloride in 1000 parts of water at 25° C. and then squeezed evenly so that the weight of solution retained is about 70% of the weight of the fabric. The fabric is dried by passing it through a zone of hot air, and then treated in an aqueous solution containing 0.1–0.2% of a condensate of ethylene oxide with an alkyl phenol and 0.1% of soda ash at 100° C. for 15 minutes.

A bright yellow dyeing of very high fastness to light, to degumming and to other wet treatments is obtained.

The following tables list other dyestuffs which may be used in the new process to give the shades indicated.

Table 1 describes azo dyestuffs obtained by coupling a diazo compound obtained from the diazo component in the first column with the coupling component of the second column to give an aminoazo compound which is then condensed with an equimolecular proportion of the halogene triazine of the third column.

*Table 1*

| | Diazo Component | Coupling Component | Triazine | Shade |
|---|---|---|---|---|
| (1) | orthanilic acid | 1-amino-8-naphthol-3:6-disulphonic acid | cyanuric chloride | red. |
| (2) | aniline | ...do... | ...do... | bluish red. |
| (3) | p-amino-benzoic acid | ...do... | ...do... | Do. |
| (4) | 4-aminotoluene-3-sulphonic acid | ...do... | ...do... | Do. |
| (5) | metanilic acid | 2-amino-5-naphthol-7-sulphonic acid | ...do... | orange. |
| (6) | orthanilic acid | ...do... | ...do... | Do. |
| (7) | 3-amino-anisole-4-sulphonic acid | ...do... | ...do... | yellowish orange. |
| (8) | 2-amino-toluene-4-sulphonic acid | ...do... | ...do... | orange. |
| (9) | orthanilic acid | 2-methylamino-5-naphthol-7-sulphonic acid. | ...do... | Do. |
| (10) | 2-naphthylamine-4:8-disulphonic acid | m-toluidine | ...do... | reddish yellow. |
| (11) | ...do... | o-anisidine | ...do... | yellow. |
| (12) | ...do... | 2-methoxy-5-methyl-aniline | ...do... | reddish yellow. |
| (13) | 2-naphthylamine-6:8-disulphonic acid | 2-ethylamino-4-methylanisole | ...do... | Do. |
| (14) | aniline-2:5-disulphonic acid | 1-(3'-aminophenyl)-3-methyl-5-pyrazolone | ...do... | yellow. |
| (15) | 3-aminoacetanilide-4-sulphonic acid | 1-(2':5'-dichloro-4'-sulphophenyl)-3-methyl-5-pyrazolone. | ...do... | greenish yellow. |
| | | the acetyl group being removed by hydrolysis after coupling | | |
| (16) | 4-nitroaniline-3-sulphonic acid | 1-(2'-methyl-5'-sulphophenyl)-3-methyl-5-pyrazolone. | ...do... | reddish yellow. |
| | | the nitro group being reduced to amino after coupling | | |
| (17) | 4-aminoanisole-3-sulphonic acid | 1-ethylamino-8-naphthol-3:6-disulphonic acid. | ...do... | red. |
| (18) | aniline | 2-amino-8-naphthol-6-sulphonic acid | ...do... | Do. |
| (19) | orthanilic acid | 2-methylamino-8-naphthol-6-sulphonic acid. | ...do... | Do. |
| (20) | benzidine | m-phenylene diamine (1 mole), 1-amino-7-phenylazo-8-naphthol-3:6-disulphonic acid (1 mole). | ...do... | grey. |
| (21) | 2-aminophenol-4-sulphonic acid | 2-amino-5-naphthol-7-sulphonic acid (copper complex) | ...do... | rubine. |
| (22) | 4-aminoazo benzene-2:2'-disulphonic acid | m-toluidine | ...do... | yellow brown. |
| (23) | 4-amino-4'-nitrostilbene-2:2'-disulphonic acid. | aniline | ...do... | yellow. |
| (24) | 2-amino-6-phenylazo-5-naphthol-7-sulphonic acid. | 2-amino-5-naphthol-7-sulphonic acid | ...do... | bluish red. |
| (25) | orthanilic acid | ...do... | cyanuric bromide. | orange. |
| (26) | 3-aminoacetanilide-4-sulphonic acid | 1-(2':5'-dichloro-4'-sulphophenyl)-3-methyl-5-pyrazolone. | 2:4-dichloro-6-anilino-s-triazine. | greenish yellow. |
| | | (the acetyl group being removed by hydrolysis after coupling) | | |
| (27) | aniline | 1-amino-8-naphthol-3:6-disulphonic acid | 2:4-dichloro-6-amino-s-triazine. | red. |

Table 2 describes anthraquinone dyestuffs obtained from equimolecular proportions of the triazine of the first column and the aminoanthraquinone of the second column.

*Table 2*

| | Triazine | Aminoanthraquinone | Shade |
|---|---|---|---|
| (28) | cyanuric chloride | 1-amino-4-(4'-aminoanilino)2:3':5-trisulpho-anthraquinone | greenish blue. |
| (29) | ----do---- | 1-amino-4-(4'-methylaminoanilino)-2:3'-disulpho-anthraquinone | blue. |
| (30) | ----do---- | 1-amino-4-(3'-aminoanilino)-2:4'-disulpho-anthraquinone | reddish blue. |
| (31) | cyanuric bromide | ----do---- | Do. |
| (32) | 2:4-dichloro-6-phenoxy-s-triazine | ----do---- | Do. |
| (33) | cyanuric chloride | 1-amino-4-(4'-aminoanilino)-2-sulpho-anthraquinone | Do. |
| (34) | 2:4-dichloro-6-methoxy-s-triazine | 1-amino-4-(4'-methylaminoanilino)-2:3'-disulpho-anthraquinone | Do. |
| (35) | ----do---- | 1-amino-4-(3'-beta-hydroxyethylanilino)2:5-disulpho-anthraquinone | blue. |
| (36) | cyanuric chloride | 1-amino-4-[4'-(4''-aminophenylazo)anilino]-2:2'':5-trisulpho-anthraquinone | Do. |
| (37) | ----do---- | 1-amino-4-(4'-amino-3'-carboxyanilino)2:5-disulpho-anthraquinone | olive green. |
| (38) | ----do---- | 2-(2''-hydroxyphenyl)-6-(4'-aminoanilino)-3':3''-disulpho-anthrapyrimidine | blue. red. |

What we claim is:

1. Process for coloring textile materials selected from the class consisting of protein and regenerated protein textile materials with a water-soluble di-chloro-s-triazinyl amino dyestuff containing as the chromophoric group a member selected from the class consisting of azo and anthraquinone chromophoric groups, which comprises applying the said dyestuff to the said textile material in an aqueous medium at a temperature from about 0° C. to about 55° C., in conjunction with a treatment with an acid-binding agent selected from the group consisting of water-soluble carbonates and bicarbonates in a dilute aqueous solution.

2. Process as claimed in claim 1 wherein the textile material dyed is silk.

3. Process as claimed in claim 1 wherein the textile material is immersed in the neutral dyestuff solution and the acid-binding agent is thereafter added to the dyestuff solution.

References Cited in the file of this patent

UNITED STATES PATENTS

| 2,773,871 | Brassel | Dec. 11, 1956 |
| 2,795,576 | Fasciati | June 11, 1957 |

OTHER REFERENCES

ICI, Procion Dyestuffs in Textile Dyeing, 1956, p. 18 (obtained through Manchester, JSDC, vol. 74, No. 5, May 1958, pp. 421–422).

Alexander: Biochem. J., vol. 52, 1952, pp. 177–184.